United States Patent
Li et al.

(10) Patent No.: US 8,628,267 B2
(45) Date of Patent: Jan. 14, 2014

(54) ACTUATING MECHANISM

(75) Inventors: Shen-Chun Li, New Taipei (TW); Hsien-Chuan Liang, New Taipei (TW); Shou-Kuo Hsu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 283 days.

(21) Appl. No.: 13/205,620

(22) Filed: Aug. 9, 2011

(65) Prior Publication Data
US 2012/0170974 A1 Jul. 5, 2012

(30) Foreign Application Priority Data

Jan. 4, 2011 (TW) .............................. 100100232 A

(51) Int. Cl.
*F16D 1/116* (2006.01)
(52) U.S. Cl.
USPC ............................ 403/316; 403/317; 403/318
(58) Field of Classification Search
USPC .......... 403/316, 317, 318, 375; 464/102, 104, 464/147, 149, 150, 182
See application file for complete search history.

(56) References Cited

U.S. PATENT DOCUMENTS

| | | | | |
|---|---|---|---|---|
| 1,182,904 A | * | 5/1916 | Hamilton et al. | 464/104 |
| 1,948,708 A | * | 2/1934 | Grundy | 464/102 |
| 2,011,147 A | * | 8/1935 | Haselau | 464/104 |
| 2,890,900 A | * | 6/1959 | Williamson, Jr. et al. | 285/238 |
| 2,892,328 A | * | 6/1959 | Templeton | 464/85 |
| 3,334,495 A | * | 8/1967 | Jensen et al. | 464/147 |
| 3,606,768 A | * | 9/1971 | Wildhaber | 464/103 |
| 3,834,182 A | * | 9/1974 | Trask et al. | 464/150 |
| 4,362,520 A | * | 12/1982 | Perry | 464/149 |
| 4,452,592 A | * | 6/1984 | Tsai | 464/102 |
| 5,022,645 A | * | 6/1991 | Green | 271/276 |
| 5,267,903 A | * | 12/1993 | Kuribayashi | 464/104 |
| 5,588,339 A | * | 12/1996 | Dulger | 74/836 |
| 6,427,307 B1 | * | 8/2002 | Al-Rawi | 29/407.05 |
| 6,517,439 B1 | * | 2/2003 | Sears | 464/104 |
| 7,674,064 B2 | * | 3/2010 | Nakamura et al. | 403/348 |

* cited by examiner

*Primary Examiner* — Gregory Binda
*Assistant Examiner* — Nahid Amiri
(74) *Attorney, Agent, or Firm* — Altis Law Group, Inc.

(57) ABSTRACT

An exemplary actuating mechanism includes a driving shaft and a driven shaft. The driving shaft includes a connecting end. Engaging blocks are formed on the connecting end with a clearance defined between each two neighboring engaging blocks. The driven shaft includes a pivot end. Protruding blocks are formed on the pivot end with a gap defined between each two neighboring protruding blocks. The driving shaft is connected with the driven shaft via the engaging blocks of the connecting end respectively engaged in the gaps and the protruding blocks of the pivot end respectively engaged in the clearances.

15 Claims, 5 Drawing Sheets

ACTUATING MECHANISM

BACKGROUND

1. Technical Field

The disclosure generally relates to mechanical actuating mechanisms, and more particularly to an actuating mechanism connected between a driving member and a driven member for power transmission therebetween.

2. Description of the Related Art

In a typical actuating mechanism, a shaft is used for connecting between a driving member, such as a motor, and a driven member, such as a load for power transmission. A shaft which connects the motor (usually called a driving shaft) is connected with a shaft which connects the load (usually called a driven shaft) via pulleys or gears. When the driving shaft and the driven shaft are required to be collinear and rotate at the same speed, a coupling for connecting the driving shaft and the driven shaft together is often needed. However, the coupling is an additional connecting element, which not only increases the cost of the actuating mechanism but also increases a weight of the actuating mechanism.

What is called for, then, is an actuating mechanism which can overcome the limitations described.

DETAILED DESCRIPTION

Reference will now be made to the figures to describe the present actuating mechanism and method in detail.

Figure 1:
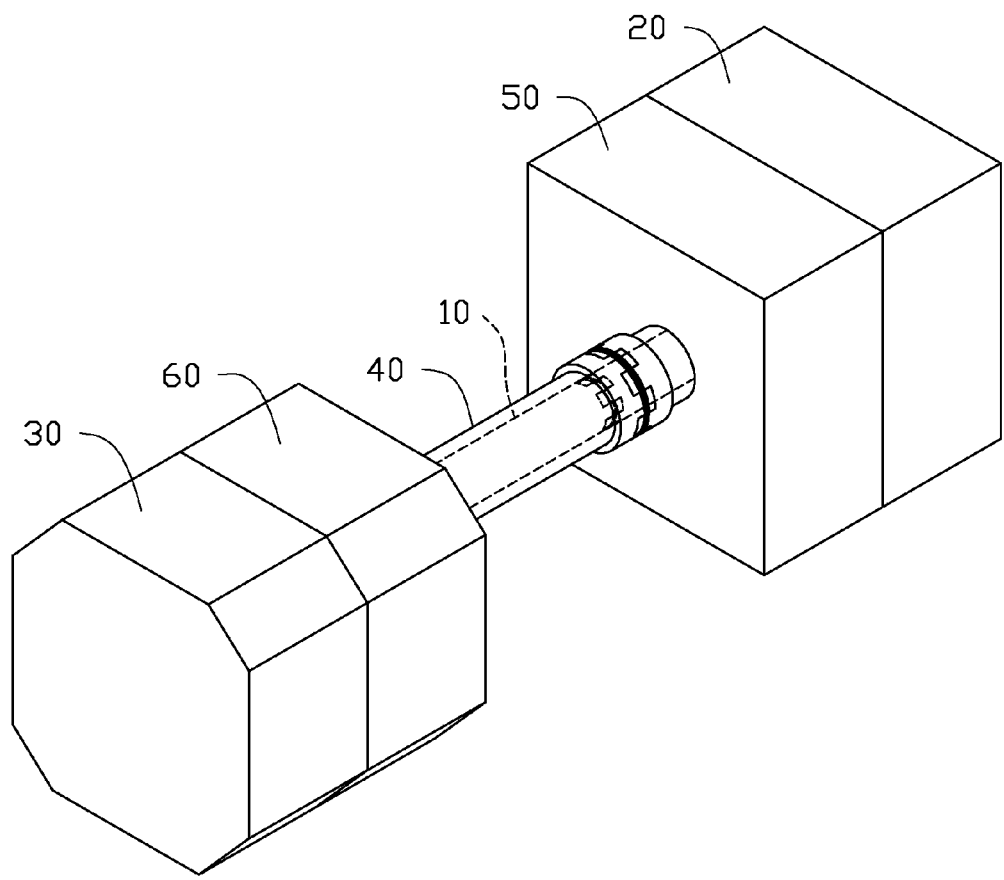
FIG. 1 is a schematic, assembled view of an actuating mechanism according to an exemplary embodiment of the present disclosure, wherein the actuating mechanism includes a first actuator and a second actuator coaxial with the first actuator.
Figure 2:
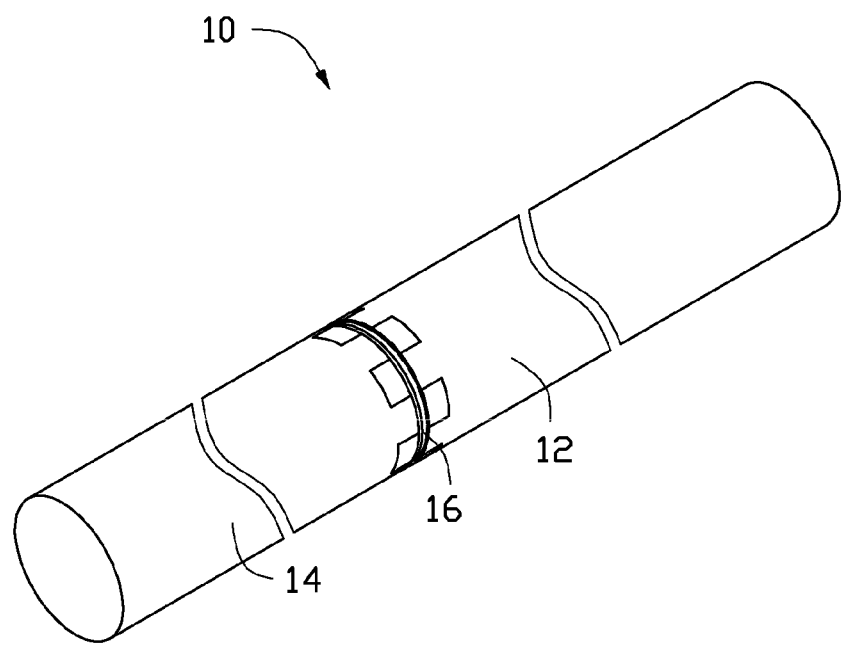
FIG. 2 is an assembled view of the first actuator of the actuating mechanism of FIG. 1.

Referring to FIGS. 1 and 2, an actuating mechanism according to an exemplary embodiment of the present disclosure is a dual-shaft actuating mechanism, and includes a first actuator 10 and a second actuator 40 coaxial with the first actuator 10. The first actuator 10 is received in the second actuator 40. The actuating mechanism is used for power transmission between a driving member which can output power, such as a motor, and a driven member which receives the power from the driving member, such as a suspended mechanical arm of a production line. When the driven member receives the power, the driven member can carry out a mechanical task such as picking and placing a workpiece.

Two opposite ends of the first actuator 10 connect a first driving member 20 and a first driven member 30, respectively. Two opposite ends of the second actuator 40 connect a second driving member 50 and a second driven member 60, respectively. To simplify the drawings, the first driving member 20, the second driving member 50, the first driven member 30 and the second driven member 60 are schematically shown as blocks.

Figure 3:
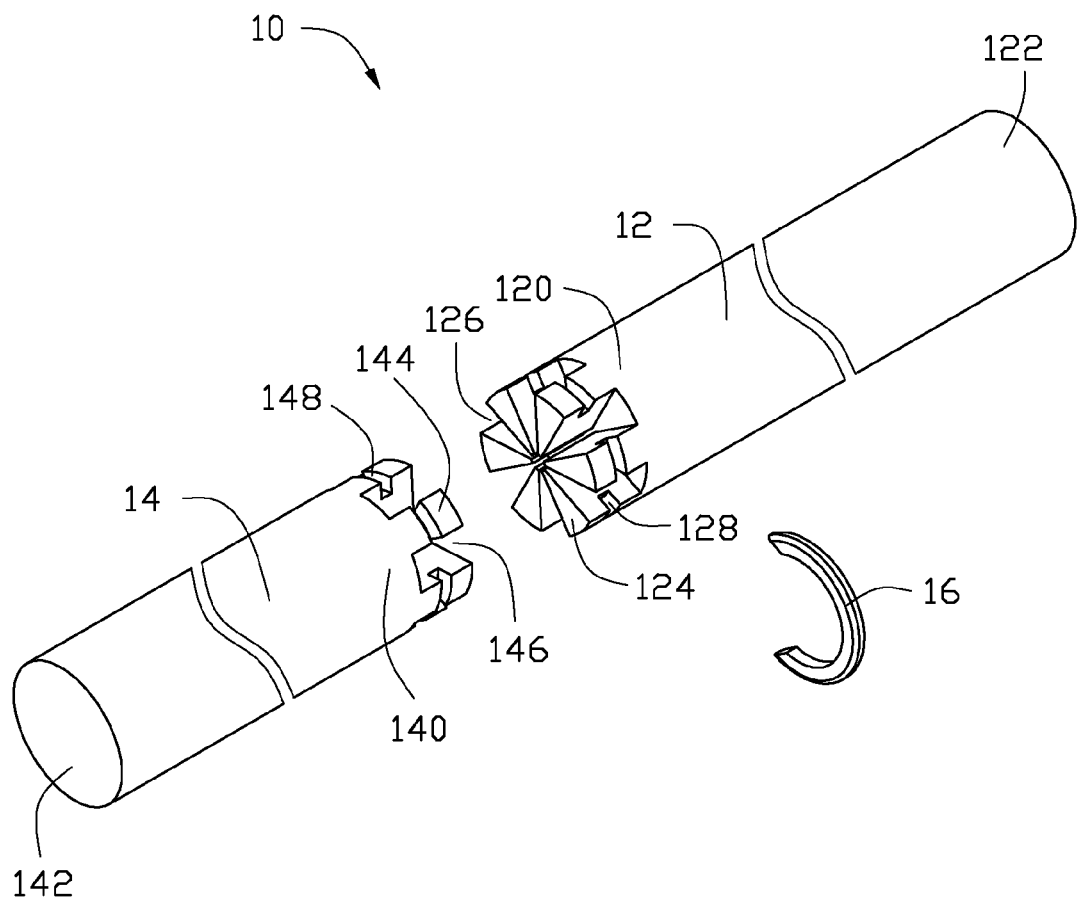
FIG. 3 is an exploded view of the first actuator of FIG. 2.

Referring also to FIGS. 2 and 3, the first actuator 10 includes a first driving shaft 12, a first driven shaft 14 connected with the first driving shaft 12, and a first locking ring 16.

Each of the first driving shaft 12 and the first driven shaft 14 is cylindrical shaped. The first driving shaft 12 and the first driven shaft 14 are made of steel, copper, copper alloy, or any other suitable material. The first driving shaft 12 includes a first connecting end 120, and a first input end 122 opposite to the first connecting end 120. The first driven shaft 14 includes a first pivot end 140, and a first output end 142 opposite to the first pivot end 140. The first connecting end 120 of the first driving shaft 12 connects the first pivot end 140 of the first driven shaft 14, the first input end 122 connects the first driving member 20, and the first output end 142 connects the first driven member 30, whereby power output by the first driving member 20 can be transmitted to the first driven member 30 via the first actuator 10.

In the present embodiment, the first driving member 20 is a step motor, which includes a stator core and a rotor magnet facing the stator core. The first input end 122 of the first driving shaft 12 connects the rotor magnet. When used, the stator core interacts with the rotor magnet to drive the rotor magnet to rotate with respect to the stator core, such that the first driving shaft 12 can rotate together with the rotor magnet.

The first connecting end 120 of the first driving shaft 12 protrudes out of the first driving member 20. A plurality of first engaging blocks 124 is formed on the first connecting end 120. The first engaging blocks 124 are equidistantly spaced from each other along a circumferential direction of the first connecting end 120 of the first driving shaft 12, with a first clearance 126 defined between each two neighboring first engaging blocks 124. Each of the first engaging blocks 124 defines a first recess 128 formed inwardly from an outer surface thereof. Each two adjacent first recesses 128 are aligned with each other along the circumferential direction of the first connecting end 120, whereby an annular first engaging groove is defined in the first connecting end 120 along the circumferential direction of the first connecting end 120.

The first pivot end 140 of the first driven shaft 14 includes a plurality of first protruding blocks 144 extending axially from an end surface thereof. The first protruding blocks 144 are equidistantly spaced from each other along a circumferential direction of the first pivot end 140, with a first gap 146 defined between each two neighboring first protruding blocks 144. Each of the first protruding blocks 144 defines a first cutout 148 formed inwardly from an outer surface thereof. Each two adjacent first cutouts 148 are aligned with each other along the circumferential direction of the first pivot end 140, whereby an annular second engaging groove is defined in the first pivot end 140 along the circumferential direction of the first pivot end 140.

When the first connecting end 120 of the first driving shaft 12 connects the first pivot end 140 of the first driven shaft 14, the first protruding blocks 144 are engaged in the first clearances 126, respectively, and the first engaging blocks 124 are engaged in the first gaps 146, respectively, such that relative rotation between the first driving shaft 12 and the first driven shaft 14 is prevented. The first recesses 128 and the first cutouts 148 are staggered with each other and located along a same imaginary annular path. The first locking ring 16 is generally C-shaped. The first recesses 128 and the first cutouts 148 are communicated with each other for receiving the first locking ring 16 therein, such that axial relative movement between the first driving shaft 12 and the first driven shaft 14 is prevented.

For obtaining a firm connection between the first driving shaft 12 and the first driven shaft 14, a size of each of the first protruding blocks 144 is slightly larger than that of the first clearances 126, and a size of each of the first engaging blocks 124 is slightly larger than that of the first gaps 146, such that the first connecting end 120 of the first driving shaft 12 can be connected with the first pivot end 140 of the first driven shaft 14 by the first engaging blocks 124 respectively interference fitted in the first gaps 146 and the first protruding blocks 144 respectively interference fitted in the first clearances 126.

Figure 4:
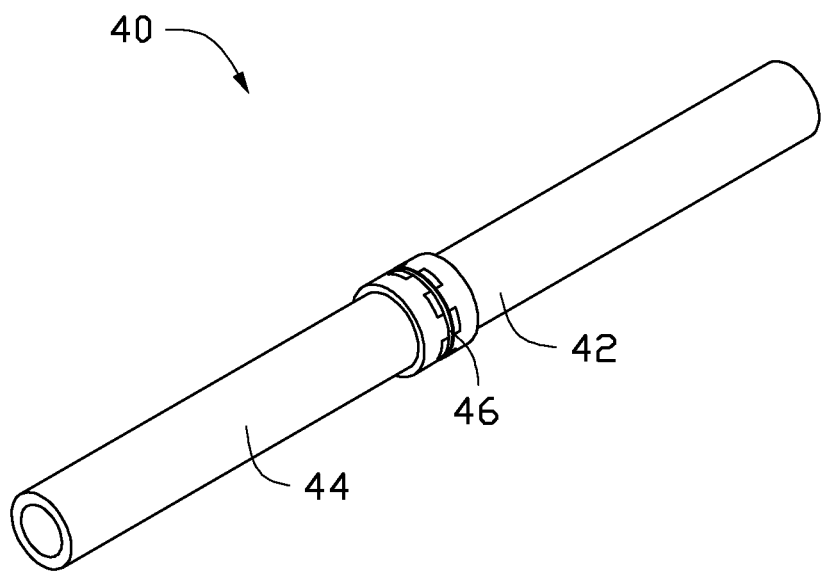
FIG. 4 is an assembled view of the second actuator of the actuating mechanism of FIG. 1.
Figure 5:
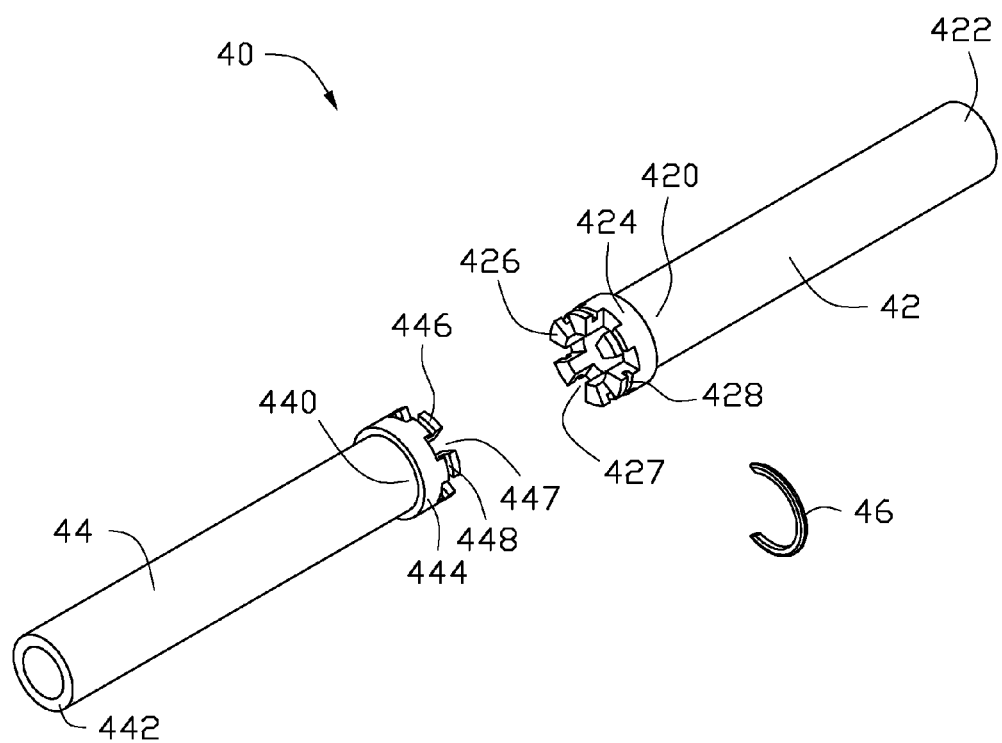
FIG. 5 is an exploded view of the second actuator of FIG. 4.

Referring to FIGS. 4 and 5 together, the second actuator 40 has a configuration similar to that of the first actuator 10. The second actuator 40 includes a second driving shaft 42, a second driven shaft 44 connected with the second driving shaft 42 and a second locking ring 46.

Each of the second driving shaft 42 and the second driven shaft 44 is generally in the shape of a hollow cylinder. An inner diameter of the second driving shaft 42 is substantially equal to an outer diameter of the first driving shaft 12. An inner diameter of the second driven shaft 44 is substantially equal to an outer diameter of the first driven shaft 14. The second driving shaft 42 includes a second connecting end 420 at one end, and a second input end 422 at the other end. The second driven shaft 44 includes a second pivot end 440, and a second output end 442 opposite to the second pivot end 440. The second connecting end 420 of the second driving shaft 42 connects the second pivot end 440 of the second driven shaft 44, the second input end 422 connects the second driving member 50, and the second output end 442 connects the second driven member 60, such that power output by the second driving member 50 can be transmitted to the second driven member 60 via the second actuator 40.

An annular supporting plate 424 extends outward and radially from an outer surface of the second connecting end 420. A plurality of second engaging blocks 426 equidistantly spaced from each other along a circumferential direction of the supporting plate 424 is formed on the supporting plate 424, with a second clearance 427 defined between each two neighboring second engaging blocks 426. Each of the second engaging blocks 426 defines a second recess 428 formed inwardly from an outer surface thereof. Each two adjacent second recesses 428 are aligned with each other along the circumference direction of the supporting plate 424, whereby an annular engaging groove is defined in the second connecting end 420 along the circumferential direction of the supporting plate 424.

An annular bearing plate 444 extends outward from an outer surface of the second pivot end 440 of the second driven shaft 44. A diameter of the supporting plate 424 is substantially equal to that of the bearing plate 444. A plurality of second protruding blocks 446 equidistantly spaced from each other along a circumferential direction of the bearing plate 444 is formed on the bearing plate 444, with a second gap 448 defined between each two neighboring second protruding blocks 446. Each of the second protruding blocks 446 defines a second cutout 448 formed inwardly from an outer surface thereof. Each two adjacent second cutouts 448 are aligned with each other along a circumferential direction of the second pivot end 440, whereby an annular engaging groove is defined in the second pivot end 440 along the circumferential direction of the bearing plate 444.

When the second connecting end 420 of the second driving shaft 42 connects the second pivot end 440 of the second driven shaft 44, the second protruding blocks 446 are engaged in the second clearances 428, respectively, and the second engaging blocks 426 are engaged in the second gaps 448, respectively, such that relative rotation between the second driving shaft 42 and the second driven shaft 44 is prevented. The second recesses 428 and the second cutouts 448 are staggered with each other and located along a same imaginary annular path. The second locking ring 46 is generally C-shaped. The second recesses 428 and the second cutouts 448 communicate with each other for receiving the second locking ring 46 therein, such that axial relative movement between the second driving shaft 42 and the second driven shaft 44 is prevented.

Similar to the first actuator 10, for obtaining a firm connection between the second driving shaft 42 and the second driven shaft 44, a size of each of the second protruding blocks 446 is slightly larger than that of the second clearances 428, and a size of each of the second engaging blocks 426 is slightly larger than that of the second gaps 448, such that the second connecting end 420 of the second driving shaft 42 can be connected with the second pivot end 440 of the second driven shaft 44 by the second engaging blocks 426 respectively interference fitted in the second gaps 447 and the second protruding blocks 446 respectively interference fitted in the second clearances 428.

When the actuating mechanism is assembled, the first actuator 10 is received in the second actuator 40 with lubricating oil filled in a clearance defined therebetween, such that friction between the first actuator 10 and the second actuator 40 can be greatly decreased during operation of the actuating mechanism. Due to the engaging blocks 124, 426 and the protruding blocks 144, 446 being formed between the connecting end 120, 420 and the pivot end 140, 440 of each of the actuators 10, 40, the driving shaft 12, 42 and the driven shaft 14, 44 of each actuator 10, 40 can firmly connect to each other without a coupling, such that the actuating mechanism has a simple structure, low cost and less weight.

It is to be further understood that even though numerous characteristics and advantages have been set forth in the foregoing description of (an) embodiment(s), together with details of the structures and functions of the embodiment(s), the disclosure is illustrative only; and that changes may be made in detail, especially in matters of shape, size, and arrangement of parts within the principles of the disclosure to the full extent indicated by the broad general meaning of the terms in which the appended claims are expressed.

What is claimed is:

1. An actuating mechanism, comprising:
   a driving shaft comprising a connecting end, a plurality of engaging blocks being formed on the connecting end, the engaging blocks being spaced from each other, a plurality of clearances thereby being defined by the engaging blocks;
   a driven shaft comprising a pivot end, a plurality of protruding blocks being formed on the pivot end, the protruding blocks being spaced from each other, a plurality of gaps thereby being defined by the protruding blocks, said driving shaft connected with said driven shaft via the engaging blocks of the connecting end respectively engaged in the gaps and the protruding blocks of the pivot end respectively engaged in the clearances; and
   another driving shaft connecting with another driven shaft to receive said driving shaft connected with said driven shaft therein;
   wherein the another driving shaft comprises a plurality of engaging blocks formed at one end thereof and spaced from each other, a plurality of clearances thereby being defined by the engaging blocks of the another driving shaft, the another driven shaft comprises a plurality of protruding blocks formed at one end thereof and spaced from each other, a plurality of gaps thereby being defined by the protruding blocks of the another driven shaft, the another driving shaft connected with the another driven shaft via the engaging blocks of the another driving shaft respectively interference fitted in the gaps defined by the protruding blocks of the another driven shaft and the protruding blocks of the another driven shaft respectively interference fitted in the clearances defined by the engaging blocks of the another driving shaft; and wherein the another driving shaft comprises an annular supporting plate extending outwardly from an outer periphery of the one end thereof, the engaging blocks are formed on the annular supporting plate, the another driven shaft comprises an annular bearing plate extending outwardly from an outer periphery of the one end thereof, and the protruding blocks are formed on the annular bearing plate.

2. The actuating mechanism of claim 1, wherein the engaging blocks of said driving shaft are interference fitted in the gaps defined by the protruding blocks of said driven shaft, respectively, and the protruding blocks of said driven shaft are interference fitted in the clearances defined by the engaging blocks of said driving shaft, respectively.

3. The actuating mechanism of claim 1, wherein each of the engaging blocks of said driving shaft defines a recess at an outer surface thereof, each of the protruding blocks of said driven shaft defines a cutout at an outer surface thereof, and the recesses and the cutouts communicate with each other for receiving a locking ring therein.

4. The actuating mechanism of claim 3, wherein the recesses and the cutouts are staggered with each other and located at a same imaginary annular ring.

5. The actuating mechanism of claim 1, wherein the engaging blocks of said driving shaft are equidistantly spaced from each other along a circumferential direction of the connecting end of said driving shaft, and the protruding blocks of said driven shaft are equidistantly spaced from each other along a circumferential direction of the pivot end of said driven shaft.

6. The actuating mechanism of claim 1, wherein each of said driving shaft and said driven shaft is cylindrical shaped.

7. The actuating mechanism of claim 1, wherein each of the another driving shaft and the another driven shaft is hollow cylindrical shaped.

8. The actuating mechanism of claim 1, wherein each of the engaging blocks of the another driving shaft defines a recess at an outer surface thereof, each of the protruding blocks of the another driven shaft defines a cutout at an outer surface thereof, and the recesses defined by the engaging blocks of the another driving shaft and the cutouts defined by the protruding blocks of the another driven shaft communicate with each other for receiving a locking ring therein.

9. The actuating mechanism of claim 1, wherein the engaging blocks of the another driving shaft are equidistantly spaced from each other along a circumferential direction of the connecting end of the another driving shaft, and the protruding blocks of the another driven shaft are equidistantly spaced from each other along a circumferential direction of the pivot end of the another driven shaft.

10. An actuating mechanism configured for power transmission between a driving member and a driven member, the actuating mechanism comprising:

a driving shaft comprising an input end configured to connect the driving member and a connecting end opposite to the input end, a plurality of engaging blocks formed on the connecting end and spaced from each other, a plurality of clearances thereby defined by the engaging blocks;

a driven shaft comprising an output end configured to connect the driven member and a pivot end opposite to the output end, a plurality of protruding blocks formed on the pivot end and spaced from each other, a plurality of gaps thereby defined by the protruding blocks, said driving shaft connected with said driven shaft via the engaging blocks of the connecting end respectively engaged in the gaps and the protruding blocks of the pivot end respectively engaged in the clearances;

another driving shaft comprising a plurality of engaging blocks formed at one end thereof and spaced from each other, a plurality of clearances thereby being defined by the engaging blocks of the another driving shaft; and another driven shaft comprising a plurality of protruding blocks formed at one end thereof and spaced from each other, a plurality of gaps thereby being defined by the protruding blocks of the another driven shaft, the another driving shaft connecting with the another driven shaft via the engaging blocks of the another driving shaft respectively interference fitted in the gaps defined by the protruding blocks of the another driven shaft, and the protruding blocks of the another driven shaft respectively interference fitted in the clearances defined by the engaging blocks of the another driving shaft;

wherein the another driving shaft further comprises an annular supporting plate extending outwardly from an outer periphery of the one end thereof, the engaging blocks are formed on the annular supporting plate, the another driven shaft further comprises an annular bearing plate extending outwardly from an outer periphery of the one end thereof, the protruding blocks are formed on the annular bearing plate, the another driving shaft is configured to connect another driving member, the another driven shaft is configured to connect another driven member, and the another driving shaft connects with the another driven shaft to receive said driving shaft connected with said driven shaft therein.

11. The actuating mechanism of claim 10, wherein each of the engaging blocks of said driving shaft defines a recess at an outer surface thereof, each of the protruding blocks of said driven shaft defines a cutout at an outer surface thereof, and the recesses and the cutouts communicate with each other for receiving a locking ring therein.

12. The actuating mechanism of claim 10, wherein each of the engaging blocks of the another driving shaft defines a recess at an outer surface thereof, and each of the protruding blocks of the another driven shaft defines a cutout at an outer surface thereof, and the recesses defined at the outer surfaces of the engaging blocks of the another driving shaft and the cutouts defined at the outer surfaces of the protruding blocks of the another driven shaft communicate with each other for receiving a locking ring therein.

13. The actuating mechanism of claim 10, wherein each of said driving shaft and said driven shaft is cylindrical shaped, and each of the another driving shaft and the another driven shaft is hollow cylindrical shaped.

14. The actuating mechanism of claim 10, wherein the engaging blocks of said driving shaft are equidistantly spaced from each other along a circumferential direction of the connecting end of said driving shaft, and the protruding blocks of said driven shaft are equidistantly spaced from each other along a circumferential direction of the pivot end of said driven shaft.

15. The actuating mechanism of claim 10, wherein the engaging blocks of the another driving shaft are equidistantly spaced from each other along a circumferential direction of the connecting end of the another driving shaft, and the protruding blocks of the another driven shaft are equidistantly spaced from each other along a circumferential direction of the pivot end of the another driven shaft.

* * * * *